(12) United States Patent
Litterer

(10) Patent No.: US 9,472,032 B2
(45) Date of Patent: Oct. 18, 2016

(54) APPARATUSES AND METHODS FOR PET ACCESS CONTROL

(71) Applicant: Intel Corporation, Santa Clara, CA (US)

(72) Inventor: Thomas E. Litterer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/495,413

(22) Filed: Sep. 24, 2014

(65) Prior Publication Data

US 2016/0086403 A1   Mar. 24, 2016

(51) Int. Cl.
*G07C 9/00* (2006.01)
*A01K 11/00* (2006.01)
*A01K 29/00* (2006.01)
*E05B 65/06* (2006.01)
*E06B 7/32* (2006.01)

(52) U.S. Cl.
CPC .......... *G07C 9/00111* (2013.01); *A01K 11/006* (2013.01); *A01K 29/00* (2013.01); *E05B 65/06* (2013.01); *E06B 7/32* (2013.01)

(58) Field of Classification Search
None
See application file for complete search history.

(56) References Cited

U.S. PATENT DOCUMENTS

| | | | | |
|---|---|---|---|---|
| 8,854,215 B1* | 10/2014 | Ellis | ......................... | 340/573.1 |
| 2006/0011145 A1* | 1/2006 | Kates | ................... | A01K 15/021 |
| | | | | 119/719 |
| 2008/0036611 A1* | 2/2008 | Noblitt | ..................... | E06B 7/32 |
| | | | | 340/573.3 |
| 2012/0025949 A1* | 2/2012 | Reed | .................. | H04B 10/1149 |
| | | | | 340/5.7 |
| 2014/0090299 A1* | 4/2014 | Brown | ..................... | E06B 7/32 |
| | | | | 49/13 |

OTHER PUBLICATIONS http://www.amazon.com/PlexiDor-Performance-Pet-Doors-Electronic/dp/B003FOBIFE/ref=sr_1_5?ie=UTF8&qid=1406915142&sr=8-5&keywords=rfid+pet+door.

* cited by examiner

*Primary Examiner* — Benjamin C Lee
*Assistant Examiner* — Rajsheed Black-Childress
(74) *Attorney, Agent, or Firm* — Schwabe, Williamson & Wyatt, P.C.

(57) ABSTRACT

Embodiments of apparatuses and methods for animal access control are described. In embodiments, a device may include an identification module to receive a digital identification from an animal. Moreover, the device may include an authentication module, coupled to the identification module, to determine an access authorization for the animal based on the digital identification and at least one access rule. Furthermore, the device may include an action module, coupled to the authentication module, to control operating of an entry based on the access authorization. Other embodiments may be described and/or claimed.

19 Claims, 6 Drawing Sheets

APPARATUSES AND METHODS FOR PET ACCESS CONTROL

FIELD OF THE INVENTION

The present disclosure relates generally to the technical field of computing, and more particularly, to apparatuses and methods for pet access control.

BACKGROUND

The background description provided herein is for generally presenting the context of the disclosure. Unless otherwise indicated herein, the materials described in this section are not prior art to the claims in this application and are not admitted to be prior art or suggestions of the prior art by inclusion in this section.

A pet door is a small portal in a wall, window or door to allow pets to access a dwelling or structures alike on their own. Some pet doors could be simple openings without a cover. Some pet doors may be equipped with a hinged or spring-loaded panel or flexible flap. More advanced pet doors may be electronically controlled. In general, the size of a pet door is calculated to be big enough to allow the pet access, but small enough to protect against undesirable weather conditions and larger-bodied intruders.

Pet access control, e.g., via a pet door, may be beneficial to millions of pet owners and their pets. For example, it is estimated that more than half of U.S. households own at least one pet. In many cases, pet owners may need to work or attend school most of the day. However, their pets may need to enter or exit a dwelling periodically throughout the day and may still need attention from or desire some interaction with their owners. On the other hand, pet owners may want to be responsible for the care and well-being of their pets or manage their pets' behavior while the pets are unsupervised.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
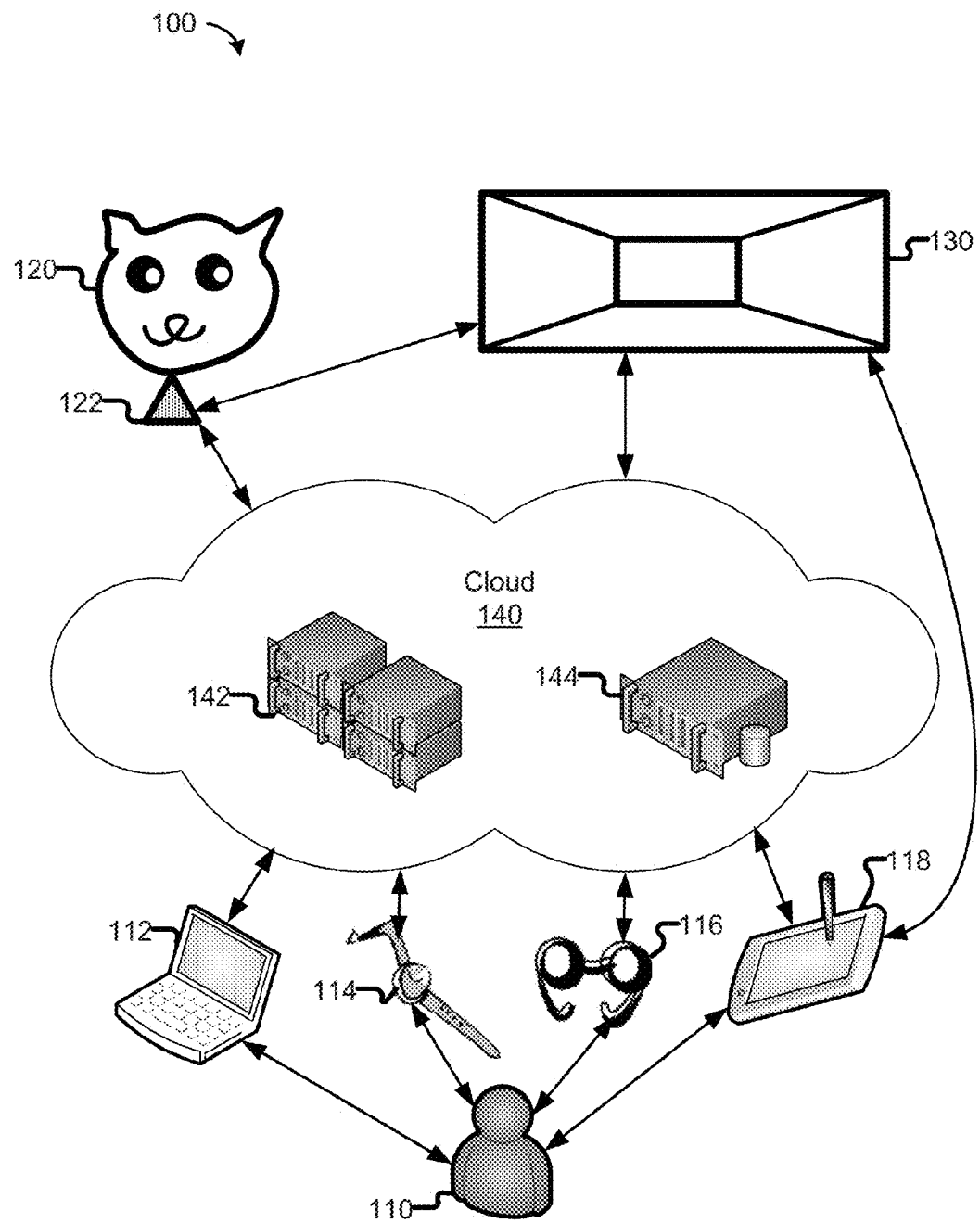
FIG. 1 is a schematic diagram illustrating an example system configuration for pet access control, incorporating aspects of the present disclosure, in accordance with various embodiments.

Embodiments of apparatuses and methods for pet access control are described. In embodiments, a device may include an identification module to receive a digital identification from a pet. Moreover, the device may include an authentication module, coupled to the identification module, to determine an access authorization for the pet based on the digital identification and at least one access rule. Furthermore, the device may include an action module, coupled to the authentication module, to control an opening of an entry based on the access authorization. These and other aspects of the present disclosure will be more fully described below.

In the following detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Reference in the description to one embodiment or an embodiment means that a particular feature, structure, or characteristic described in connection with the embodiment is included in at least one embodiment of the invention. The description may use the phrases "in one embodiment," "in another embodiment," "in some embodiments," "in embodiments," "in various embodiments," or the like, which may each refer to one or more of the same or different embodiments. Furthermore, the terms "comprising," "including," "having," and the like, as used with respect to embodiments of the present disclosure, are synonymous.

In embodiments, the term "module" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, a module may be implemented in firmware, hardware, software, or any combination of firmware, hardware, and software.

In embodiments, for the purposes of the present disclosure, the term "recommendation" means any decision making, inference, or discovery, e.g., based at least in part on environmental data. For the purposes of the present disclosure, the phrase "context" or "contextual information" means any information that can be used to characterize the interaction between a user and a particular environmental setting.

Referring now to FIG. 1, an example system configuration for pet access control, in accordance with various embodiments, is illustrated. System 100 may include various user devices of one or more users, where some or all of these user devices may have direct or indirect access via networking to service devices on a cloud or a pet access control device, which may be used to control access and provide trainings for pets.

As illustrated in FIG. 1, user devices may include mobile device 112, wearable devices 114 and 116, or mobile device 118. In some embodiments, user devices may wirelessly connect to service devices in computing cloud 140 (hereinafter, cloud 140), such as application server 142 and data server 144. In some embodiments, user devices may wirelessly connect to control device 130, directly or via cloud 140. As will be described in more detail below, user devices, and service devices may be respectively incorporated with corresponding teachings of the present disclosure to manage pet access control via control device 130.

In embodiments, wearable device 114 or 116 may be wearable miniature computers, also known as body-borne computers. In embodiments, wearable device 114 or 116 may have a device body or form factor with shape, dimension, and materials configured for the device to be worn by user 110. As an example, wearable device 114 may have a form factor configured to be worn on a wrist, such as in the arrangement of watches. As another example, wearable device 116 may have a form factor configured to be worn on a head, such as in the arrangement of eyeglasses. In embodiments, wearable device 114 or 116 may also be worn by the wearer under, with, or on top of clothing near other parts of a human body, such as the arm, leg, neck, foot, etc.

In embodiments, mobile device 112 may be a mobile computer, such as a laptop computer. Mobile device 118 may be a portable communication device, such as a smartphone or a tablet computer. While not illustrated, user devices in system 100 may also include a handheld computer, a laptop, a cellular phone, a pager, an audio and/or video player (e.g., an MP3 player, a DVD player, etc.), a gaming device, a video camera, a digital camera, a navigation device (e.g., a GPS device), a wireless peripheral (e.g., a headset, etc.), and/or other suitable user electronic devices, enhanced with the teachings of the present disclosure.

In embodiments, wearable device 114 or 116, mobile devices 112 or 118, or other suitable user devices may be equipped with suitable user interface and input/output devices, to enable user 110 to manage pet access and pet training via control device 130. In some embodiments, these user devices may be configured to communicate with control device 130 using dedicated short-range communications (DSRC), near field communication (NFC), or Bluetooth and Wi-Fi connections. Recognizing that the foregoing communication technologies were merely indicative of potential underlying communication technologies, which may be used between a user device and control device 130, in other embodiments, different communication technologies may also be used. Therefore, a user device may receive information about pets from control device 130 or send control/management commands to control device 130.

In embodiments, user devices in system 100 may be configured to communicate with cloud 140, a computing infrastructure complex. Cloud 140 may support cloud computing, which generally refers to an adequately resourced computing model with resources, such as hardware, storage, management solutions, security solutions, business applications, etc., available as services via networking Cloud 140 may generally offer its services as infrastructure as a service (IaaS), platform as a service (PaaS), software as a service (SaaS), network as a service (NaaS), and communication as a service (CaaS). Moreover, cloud 140 may specifically offer services, based on one or more service types, such as IaaS, PaaS, SaaS, NaaS, or CaaS, supporting pet access control services. Furthermore, such services may be made available on demand and may be delivered economically.

In embodiments, cloud 140 may include one or more server devices, for example, application server 142 and/or data server 144, incorporated with the teachings of the present disclosure, to cooperatively enable pet access control. In embodiments, application server 142 may perform application related logic relating to pet access control. In some embodiments, application server 142 may be configured to manage users, various control devices, and their respective relationships. Therefore, application server 142 may provide a user access to a specific pet control device based on predetermined access rule. As an example, the manufacture or the distributor of control device 130 may set up application server 142 on cloud 140 so that user 110 may register and/or manage control device 130 remotely. In some embodiments, application server 142 may provide more comprehensive or additional management functions for users to manage their control devices online, compared to what a stand-alone control device may provide. In some embodiments, some components/functions of application server 142 may be distributed to various locations in cloud 140 or control device 130. Similarly, some components/functions of control device 130 may be consolidated back to application server 142 in other embodiments.

In embodiments, data server 144 may be configured to serve multiple user devices associated with user 110, as well as multiple users. Data server 144 may be configured to store technical specifications of various control devices, users' information, and information of user devices. Data server 144 may be configured to register or associate multiple user devices with user 110, such as wearable device 114 and mobile device 118, using, for example, the user's email address, phone number, driver's license number, student identification number, passport number, biological information, or any other suitable credential. Therefore, regardless of which user device user 110 may use, data server 144 may still properly relate the user device with its associated control devices. In embodiments, a user device, a control device, and a server device may be separate and different entities.

In embodiments, cloud 140 may include one or more wireless and/or wired networks to operatively couple the user devices or merchant devices to those service devices. Cloud 140 may be accessed via public and/or private networks, such as, but not limited to, the Internet, a telephone network (e.g., public switched telephone network (PSTN)), a local area network (LAN), a wide area network (WAN), a cable network, an Ethernet network, and so forth. Wireless communication networks may include various combinations of wireless personal area networks (WPANs), wireless local area networks (WLANs), wireless metropolitan area networks (WMANs), and/or wireless wide area networks (WWANs). In embodiments, a user device or a control device may be coupled to these networks via a cellular network and/or a wireless connection.

In various embodiments, pet 120 may carry tag 122, which may include a unique identification of pet 120. In some embodiments, tag 122 may be mounted to a wearable device for pet 120, such as a collar. In other embodiments, tag 122 may be a microchip implanted in pet 120. In various embodiments, tag 122 may wirelessly communicate with control device 130. In some embodiments, tag 122 may transmitter a code via optical communications, e.g., infrared, to control device 130. In some embodiments, tag 122 may transmit the code to control device 130 via near field communication (NFC). As an example, tag 122 may include an unpowered NFC chip. In some embodiments, tag 122 may transmit the code to control device 130 using radio-frequency electromagnetic fields in a radio-frequency identification (RFID) standard; for example, tag 122 may include an RFID transponder. The RFID transponder may contain electronically stored information, such as identification, location, or time information. The RFID transponder may be powered by and read at short ranges via magnetic fields by control device 130. In other embodiments, communications between tag 122 and control device 130 may be based in other suitable communication technologies.

Control device 130 may provide pet access control and pet training in various embodiments. At least one embodiment of control device 130 is further illustrated in FIG. 2. In various embodiments, control device 130 may have a suitable form factor so that it may be packaged together with a pet door/gate. In some embodiments, the pet door may have multiple gating measures in different size. Control device 130 may selectively unlock a suitable gating measure based on the particular pet that needs access, e.g., unlock a small cat flap or a large dog door depends on which pet needs access.

In various embodiments, control device 130 may enable a pet owner to fully control pet access from any location through a user device over a network, e.g., Internet. As an example, user 110 may create a set of access rules in a user device to be used by control device 130. As another example, user 110 may program control device 130 via a user device. As yet another example, real-time information captured by control device 130 may be transmitted to the pet owner for the pet owner to make decisions on pet access control.

In various embodiments, control device 130 may enable multiple authentication mechanisms. For example, one authentication mechanism may be based on the information transmitted from tag 122; another authentication mechanism may be based on a visual or audio sample of pet 120; yet another authentication mechanism may be based on the behavioral model of pet 120; and yet another authentication mechanism may be based on the response of pet 120 to a visual cue or an audio command from control device 130. Therefore, control device 130 may enable precise access control for pets, prevent tailgating by other animals, and prevent people from using an animal's tag to gain unauthorized access.

In various embodiments, control device 130 may be equipped with or coupled to a speaker, a microphone, a display, a treat dispenser, and/or other peripheral devices (not shown) to facilitate authentication or pet training Particularly, pet behavior may be trained via control device 130 without the pet owner being present. As an example, pet access may be denied if the pet keeps on barking or whining, so that the pet may be trained to be quiet. As another example, voice commands of the pet owner may be recorded and stored in control device 130, so that selective commands may be played back to the pet based on its situation. For example, a command of "shower" may be given when a muddy dog is detected, so that the dog may be trained to take a shower in a designated shower place before being granted access. In various embodiments, good behavior or a correct response from a pet may be acknowledged by a pet treat dispensed from a treat dispenser, an audio signal, and/or an indicator that the door is unlocked, e.g., a green light on the pet door.

In various embodiments, control device 130 may log pet access records. Pet access records may include successful and/or failed entries made by known or unknown pets. As an example, pets with RFID tags may be specifically logged at their time of entry. As another example, any animal that agitates control device 130, e.g., via a motion sensor of control device 130; any visual activities in the vicinity of control device 130, e.g., within visual range of a camera of control device 130; or any sound audible to control device 130, e.g., audio beyond an audio threshold of a voice-activated microphone of control device 130, may all be selectively logged based on user-defined rules or system configuration of control device 130. In various embodiments, pet access records may provide pet owners behavior information of pets, thus enabling pet owners to make intelligent decisions for future pet training, e.g., via control device 130.

In various embodiments, control device 130 may be programmed with inclusion rules as well as exclusion rules so that eligible pets may gain access, while ineligible animals (ill animals, intruders, tailgaters, etc.) may be denied access. With control device 130, pets may be allowed to exit or enter a dwelling for potty breaks, exercise, and outside freedom. Appropriate pet access, e.g., to the yard, means not only reduced accidents but also improved health for pets, e.g., by preventing bladder infections due to holding for too long. With control device 130, a pet door may have improved weather resistance, and home security against stray animals and other intruders, for example, unrecognized animals may be denied access. With control device 130, pet access may be managed and controlled by a set of inclusion and exclusion rules based on the time, the location, the identification of the pet, the behavior of the pet, and/or other factors.

In various embodiments, control device 130 may be developed from the Intel® Edison development platform, which is a tiny computer with one or more cores, and networking capabilities, e.g., via Bluetooth and Wi-Fi.

Figure 2:
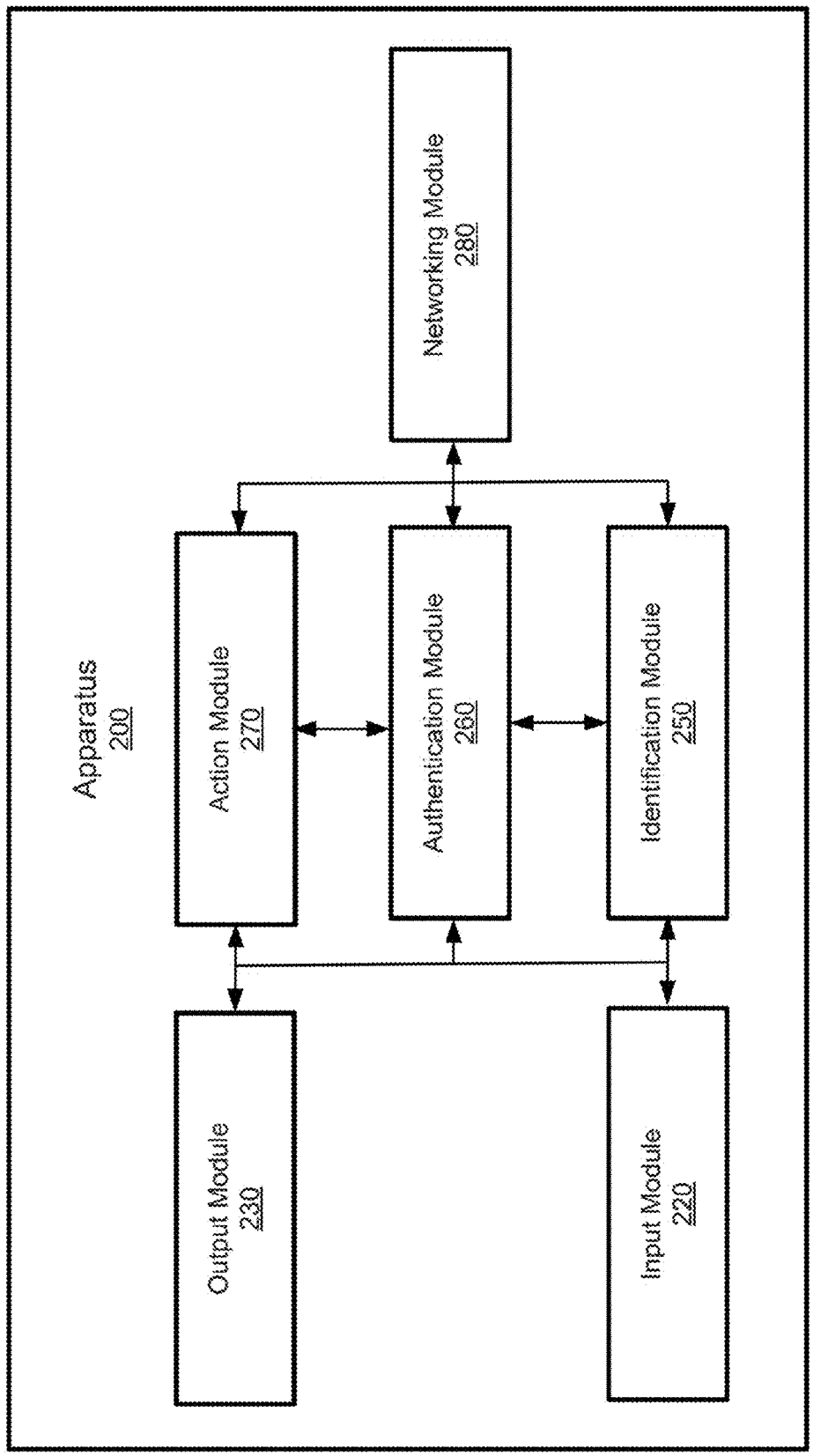
FIG. 2 is a schematic diagram illustrating an example apparatus for pet access control, incorporating aspects of the present disclosure, in accordance with various embodiments.

Referring now to FIG. 2, a schematic diagram illustrating an example apparatus for pet access control, incorporating aspects of the present disclosure, in accordance with various embodiments, is illustrated. In some embodiments, apparatus 200 may include identification module 250, input module 220, output module 230, authentication module 260, action module 270, and networking module 280. In other embodiments, different modules may be implemented to realize similar functionalities in aforementioned modules.

In embodiments, identification module 250 may be configured to receive a digital identification from a pet. In some embodiments, identification module 250 may include a radio-frequency identification reader to read an RFID. In some embodiments, identification module 250 may include an infrared reader to read a modulated infrared beam. In other embodiments, identification module 250 may utilize other technologies to decode the digital identification, e.g., contained in tag 122 in connection with FIG. 1.

In embodiments, authentication module 260 may be configured to determine an access authorization for the pet based on the digital identification received by identification module 250 and at least one access rule. In embodiments, access rules may include inclusion rules as well as exclusion rules. Inclusion rules may define criteria for granting access while exclusion rules may define criteria for denying access. As an example, a simple inclusion rule may grant access to a specific digital identification. By the same token, a simple exclusion rule may deny access to a specific digital identification, e.g., an ID associated with a neighbor's pet. As another example, a time-based inclusion or exclusion rule may define specific hours for keeping a pet either inside or outside, e.g., after midnight, all pets may be denied access for six hours. In embodiments, inclusion or exclusion rules may be deterministic or heuristic. As an example, a rule to grant access to a pet solely based on its digital identification is deterministic. On the other hand, a rule to deny access to a pet based on whether there is another tailgating animal may be heuristic, as determining tailgating usually may relate to a speculative formulation.

In embodiments, input module 220 may be configured to include an audio input or image capture device, coupled to authentication module 260, to capture audio or image information of a pet or the area surrounding a pet door. Visual or audio indicators of the pet or the surrounding area may enable authentication module 260 to conduct another level of authentication. In various embodiments, authentication module 260 may determine the access authorization further based on the audio or image information captured. As an example, images of authorized pets may be stored in apparatus 200. Further, authentication module 260 may be configured to perform image recognition by comparing the image captured with known pet images. As another example, voice samples (e.g., barking, whining) of authorized pets may be stored in apparatus 200. Thus, authentication module 260 may perform voice recognition by comparing the captured audio sample with known pet voice samples. On the other hand, authentication module 260 may utilize exclusion rules based on image/voice recognition. As an example, authentication module 260 may deny the access authorization upon detecting another pet in the vicinity of the pet based on images captured by the image capture device, so that tailgating may be discouraged. As another example, authentication module 260 may deny the access authorization upon detecting barking or other animal noises indicating danger for pets, so that pets may stay safe in the home.

In various embodiments, input module 220 may be configured to capture the motion of a pet using its audio input and image capture devices or other appropriate sensors. The motion of a pet may include information about the direction, the speed, the path, and even the projected trajectory of a pet's movement. Accordingly, authentication module 260 may determine whether a pet needs access to a pet door or is just playing around the pet door. In the latter case, no further authentication steps may be conducted by authentication module 260. In some embodiments, a pet door may be opened in two or more different directions, such as toward the inside or outside, or even to different rooms that a pet may go into. In this case, authentication module 260 may determine the appropriate opening direction for a pet door based at least in part on the projected trajectory of a pet's movement.

In various embodiments, input module 220 may be configured to capture the biometric information of a pet using its audio input and image capture devices or other appropriate sensors. Biometric information may be used by authentication module 260 to identify a pet based on its distinctive characteristics, such as physiological characteristics (e.g., fingerprint, palm veins, face recognition, DNA, palm print, hand geometry, retina, odor, etc.) or behavioral characteristics (e.g., gait, voice, etc.)

In embodiments, output module 230 may be configured to include an audio output or display device to provide an audible instruction or a visual instruction to a pet. In some embodiments, such instructions may be default to apparatus 200 or recorded in advance from the pet owner, e.g., configured through a user device. In other embodiments, such instructions may be given by a pet owner or an authorized user in real time, such as after receiving a prompt for pet access authorization from apparatus 200. In various embodiments, such instructions may be used to train pets.

In various embodiments, authentication module 260 may be further configured to determine the access authorization for a pet based at least in part on how the pet responds to the audible instruction or a visual instruction. The response from the pet may be captured by the audio input or image capture device in input module 220. This level of authentication is analogous to providing correct answers to a challenge. As an example, a voice instruction of "sit" or other commands may be played back to a pet requesting access. A well-trained pet may demonstrate the expected response, such as to sit before the pet door while a stray animal may not. Thus, authentication module 260 may further determine the access authorization based on whether the pet is able to provide the expected correct response.

With input module 220 and output module 230, apparatus 200 may prevent a pet from exiting or entering when movement is detected outside the door that is not from an authorized animal. Apparatus 200 may require specific behavior from the pet before it uses the door, for example, a pet's known behaviors of sitting, tapping the door, etc. when requesting access. Apparatus 200 may conduct additional layers of authentication based on captured images of pets or the surroundings, or enable real-time monitoring of a field of vision. Apparatus 200 may allow a pet owner to manually unlock a pet door based on visual confirmation provided by apparatus 200.

With input module 220 and output module 230, apparatus 200 may require specific audio indicators for pet access. As an example, apparatus 200 may require a pet's normal behaviors to be observed for pet access, such as barking, whining, etc. Alternatively, apparatus 200 may require specific noises to be absent for pet access. As an example, apparatus 200 may be used to train pets to not bark or whine by denying a pet access until the pet becomes quiet. As another example, apparatus 200 may deny a pet access until rain stops. As yet another example, apparatus 200 may deny a pet access until other stray animals' noise is away from the pet door.

With input module 220 and output module 230, apparatus 200 may facilitate a pet owner to train a pet. As an example, apparatus 200 may train a pet to provide visual or audio indicators by automatically voicing commands when a recognized RFID tag is nearby. For instance, apparatus 200 may be used to stop unwanted pet behavior, such as barking, by giving the "quiet" command when barking is heard. In some embodiments, apparatus 200 may serve as a conduit for a pet owner to give real-time commands. For example, apparatus 200 may work as a real-time monitor and be connected to a remote user device, e.g., via networking module 280. In this case, a pet owner may command a pet to perform or stop certain behavior based on captured visual and audio information.

In embodiments, action module 270 may be configured to control operating of an entry based on the access authorization. In various embodiments, the entry may be a pet door, and apparatus 200 may additionally include the pet door. Therefore, once the access is granted, the pet door may be opened for a period of time, such as sixty seconds. In some embodiments, action module 270 may re-lock the pet door as soon as the pet completes its entry or exit, e.g., by detecting the movement of the pet.

In embodiments, action module 270 may be further configured to dispense a pet treat to the pet when authentication module 260 verifies one or more predetermined behavioral patterns of the pet. Action module 270 may be connected to a treat dispenser, and action module 270 may actuate the treat dispenser when authentication module 260 verifies an expected behavior or response from a pet. As an example, action module 270 may train and reinforce behaviors automatically by dispensing treats when a dog sits on a dog mat after entering the house. As another example, action module 270 may dispense treats to bring a pet within visual range of the pet door for further authentication, such as for face recognition. In various embodiments, good behavior or correct response from a pet may be acknowledged by a treat dispensed from a treat dispenser, an audio signal, and/or an indicator that the door is unlocked, e.g., a green light on the pet door.

In embodiments, networking module 280 may be coupled with authentication module 260, and configured to wirelessly communicate with a user device to facilitate the user device to configure or program apparatus 200. As an example, a user device may be connected to networking module 280 to program access rules for apparatus 200. As an example, networking module 280 may be connected to a user device to allow a user to record voice commands for pets.

In embodiments, networking module 280 may be coupled with identification module 250 and authentication module 260 to provide the received digital identification or the captured image information of the pet to a user device, and to receive, in response, from the user device, an access command for authentication module 260. In some embodiments, networking module 280 may facilitate real-time pet access control by enabling a user device to monitor the real-time situation near a pet door, and receiving real-time commands from the user device.

In embodiments, networking module 280 may be coupled with authentication module 260, to receive climate information near the apparatus from an online service, so that authentication module 260 may further determine the access authorization for the pet based at least in part on the climate information near apparatus 200. As an example, pet access may be denied if there are thunderstorms or severe weather conditions outdoors.

In embodiments, networking module 280 in apparatus 200 may utilize one or more wireless or wired networks to communicate with other devices. These wireless or wired networks may include public and/or private networks, such as, but not limited to, LANs, WANs, or the Internet. In some embodiments, these wireless networks may include one or more WPANs, WLANs, WMANs, or WWANs. In some embodiments, these wireless networks may include cellular networks.

In some embodiments, communications to and from networking module 280 may be based at least in part on a radio-frequency identification standard. As an example, a pet tag may be equipped with a transponder to transfer data using radio-frequency electromagnetic fields. The transponder may contain electronically stored information, such as the identification associated with the pet. The transponder may be powered by and read at short ranges via magnetic fields. In other embodiments, networking module 280 may communicate with other devices based at least in part on near field communication (NFC), optical communications, or other suitable communication technologies, such as Bluetooth or Wi-Fi.

In embodiments, apparatus 200 may be implemented differently as depicted in FIG. 2. As an example, input module 220 or output module 230 may be integrated into authentication module 260. As another example, identification module 250 may also be integrated into authentication module 260. In embodiments, some or all components of apparatus 200 may be distributed across any number of different devices or networks.

Figure 3:
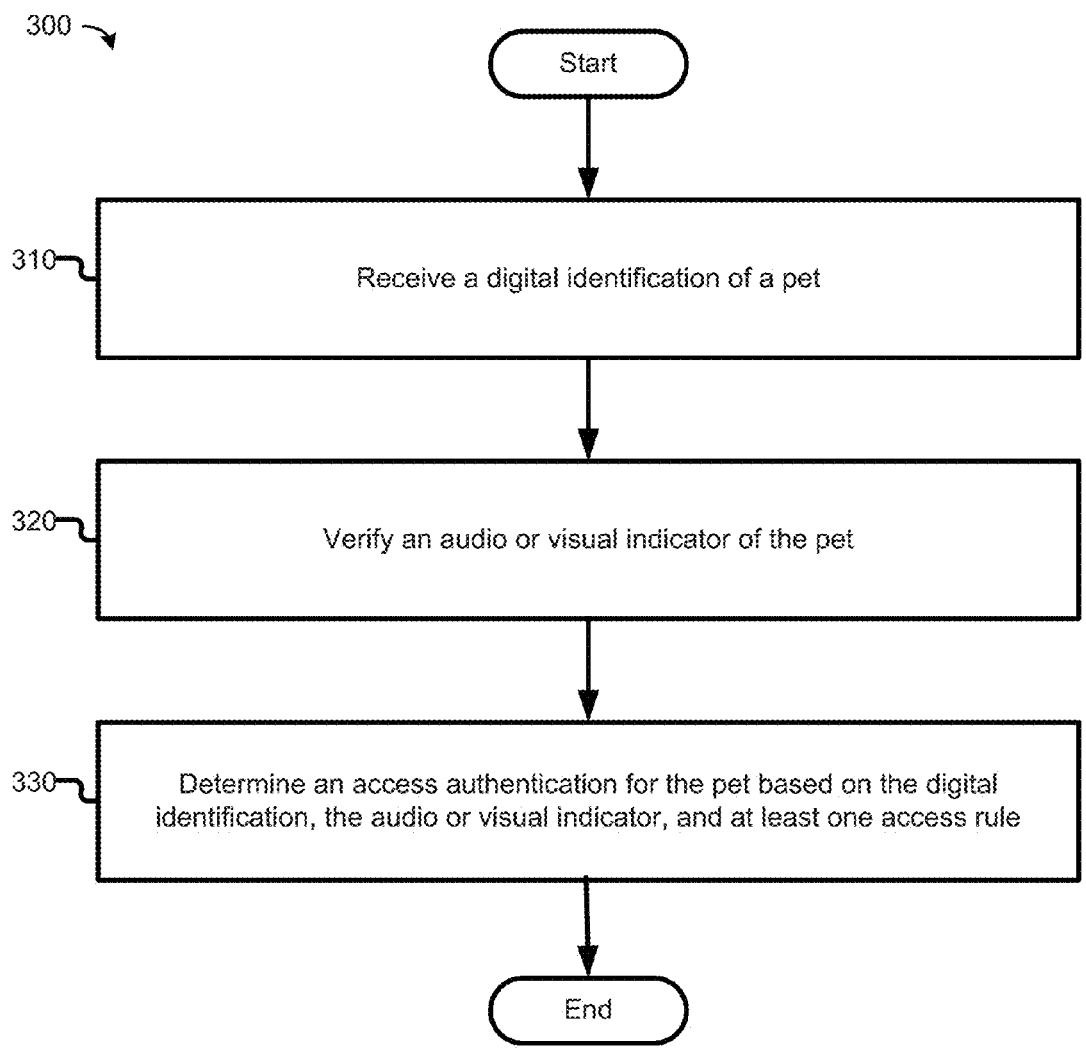
FIG. 3 is a flow diagram of an example process for pet access control, which may be practiced by an example apparatus, incorporating aspects of the present disclosure, in accordance with various embodiments.

Referring now to FIG. 3, it is a flow diagram of an example process for pet access control, which may be practiced by an example user device in accordance with various embodiments. The process 300 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured for pet access control. As such, process 300 may be performed by a computing device, e.g., apparatus 200, to implement one or more embodiments of the present disclosure.

In embodiments, the process may begin at block 310, where a digital identification of a pet may be received, e.g., by control device 130 or identification module 250 in apparatus 200. As discussed in connection with FIG. 1 and FIG. 2, in embodiments, the digital identification may be embodied in modulated signals, datagrams, infrared beams, electronic messages, or any suitable format for containing identification information. In some embodiments, the digital identification may be sent by tag 122 voluntarily to control device 130. In some embodiments, the digital identification may be sent by tag 122 as a response to the request from control device 130 in connection to FIG. 1. For example, tag 122 may be an RFID transponder, and it may be actuated by an RFID reader in control device 130.

Next, at block 320, an audio or visual indicator of the pet may be verified, e.g., by authentication module 260. As discussed in connection with FIG. 2, an audio or visual input device associated with input module 220 may capture the audio or visual indicator of the pet. In some embodiments, such an audio or visual indicator may be captured without awareness of the pet. In other embodiments, such an audio or visual indicator may be captured as a response from the pet to system prompts from control device 130, such as audio or visual commands. Further in other embodiments, authentication module 260 may verify whether there is another pet in the vicinity of the pet. The access may be denied to prevent tailgating if another animal is detected in the vicinity of the pet that requested access.

Next, at block 330, an access authorization may be determined for the pet based on the digital identification, the audio or visual indicator, and at least one access rule, e.g., by authentication module 260. In various embodiments, authentication module 260 may use multiple layers of authentication mechanisms, such as by checking the digital identification or by image recognition or voice recognition. In various embodiments, authentication module 260 may grant or deny pet access based on one or more access rules. Access rules may include various inclusion or exclusion rules. These rules may be deterministic or heuristic. These rules may be prioritized in different ranks, such as in primary, secondary, and tertiary rules. In some embodiments, primary rules may be checked first. If no decisive access determination is obtained, then secondary rules may be checked. By the same token, tertiary rules may be invoked for more complex situations. As an example, a primary rule may be based on digital identifications. A secondary rule may be based on audio or visual indicators of a pet. A tertiary rule may be based on a response from the pet to audio or visual commands issued to the pet.

In some embodiments, access rules may be related to parameters independent of a particular pet. As an example, access rules may be based on in-situ environmental information, e.g., received from a weather service or from sensors coupled to authentication module 260. As another example, access rules may be based on time of day. For instance, access may be limited to only certain predetermined hours. Consequently, access may be granted or denied based on when the digital identification is received. In various embodiments, the result of such access authorization may be saved into a access log.

Figure 4:
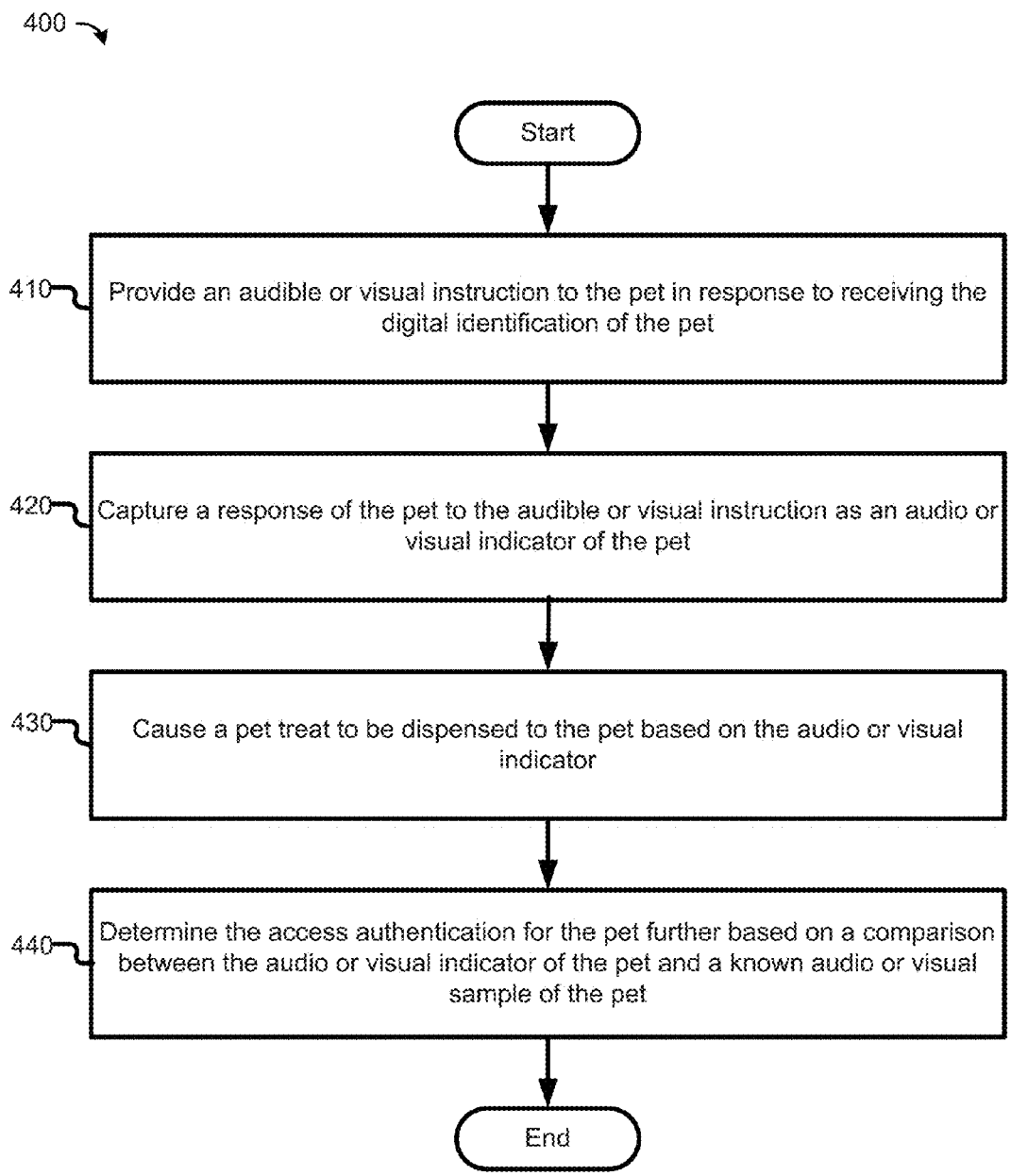
FIG. 4 is a flow diagram of another example process for pet access control, which may be practiced by an example apparatus, incorporating aspects of the present disclosure, in accordance with various embodiments.

Referring now to FIG. 4, it is a flow diagram of another example process for providing access authorization for pets, which may be practiced by an example merchant apparatus in accordance with various embodiments. The process 400 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured for pet access control. As such, process 400 may be performed by a computing device, e.g., apparatus 200, to implement one or more embodiments of the present disclosure. In embodiments, various blocks in FIG. 4 may be combined or arranged in any suitable order, e.g., according to the particular configuration of a control device, to enable pet access control.

In embodiments, the process may begin at block 410, where an audible or visual instruction to the pet may be provided in response to receiving the digital identification of the pet, e.g., by authentication module 260 and output module 230. In various embodiments, advanced authentication mechanisms may involve two-way communications between a pet and authentication module 260. In some embodiments, the audible or visual instructions may be predetermined. As an example, a set of predetermined commands may be arranged in a particular order and issued to the pet at block 410. These commands may be arranged in a fixed list. These commands may be dynamically reordered in a random fashion. In other embodiments, the audible or visual instructions may be dynamically generated. As an example, such instructions may be generated based on the actual scenario. For instance, a command of "shake" may be issued to request the pet to remove water from its fur by shaking if it is a rainy day.

Next, at block 420, a response of the pet to the audible or visual instruction may be captured as an audio or visual indicator of the pet, e.g., by input module 220. In embodiments, a microphone, a camera, or a suitable sensor may be used to capture the response of a pet to an instruction as the audio or visual indicator of the pet. As an example, shaking may be defined as rapid and intensive movement within a limited space. Therefore, a sequence of images capturing the movement of a pet after the issuance of an instruction may be used as the visual indicator of the pet. In some embodiments, such an audio or visual indicator of the pet may be analyzed by authentication module 260. In other embodiments, such an audio or visual indicator of the pet may be sent to the pet owner for inspection.

Next, at block 430, a pet treat may be dispensed to the pet based on the audio or visual indicator, e.g., by action module 270. In some embodiments, block 430 may be optional. In some embodiments, treat-dispensing may be used as a tool to train the pet. As an example, a treat may be dispensed to reinforce the correct response from the pet, or reward the pet for being responsive to the instruction. In some embodiments, treat- dispensing may be a tool to induce the pet to a specific location so that further authentication mechanisms may be performed, such as facial recognition where a clear facial image may be needed. In this case, a further captured facial image of the pet may be used as another visual indicator of the pet.

Next, at block 440, the access authorization for the pet may be further determined based on a comparison between the audio or visual indicator of the pet and a known audio or visual sample of the pet, e.g., by authentication module 260. In some embodiments, the known audio or visual sample of the pet may be prepared in advance, such as recorded by the pet-owner. In some embodiments, the known audio or visual sample of the pet may be learned by authentication module 260, e.g., from the access log that includes audio or visual samples of the same pet. Authentication module 260 may use any known technology for audio comparison or image comparison. In some embodiments, the audio or visual indicator of the pet may be transmitted to the pet owner, so that the pet owner may judge whether the audio or visual indicator of the pet complies with the expected behavior of the pet.

Figure 5:
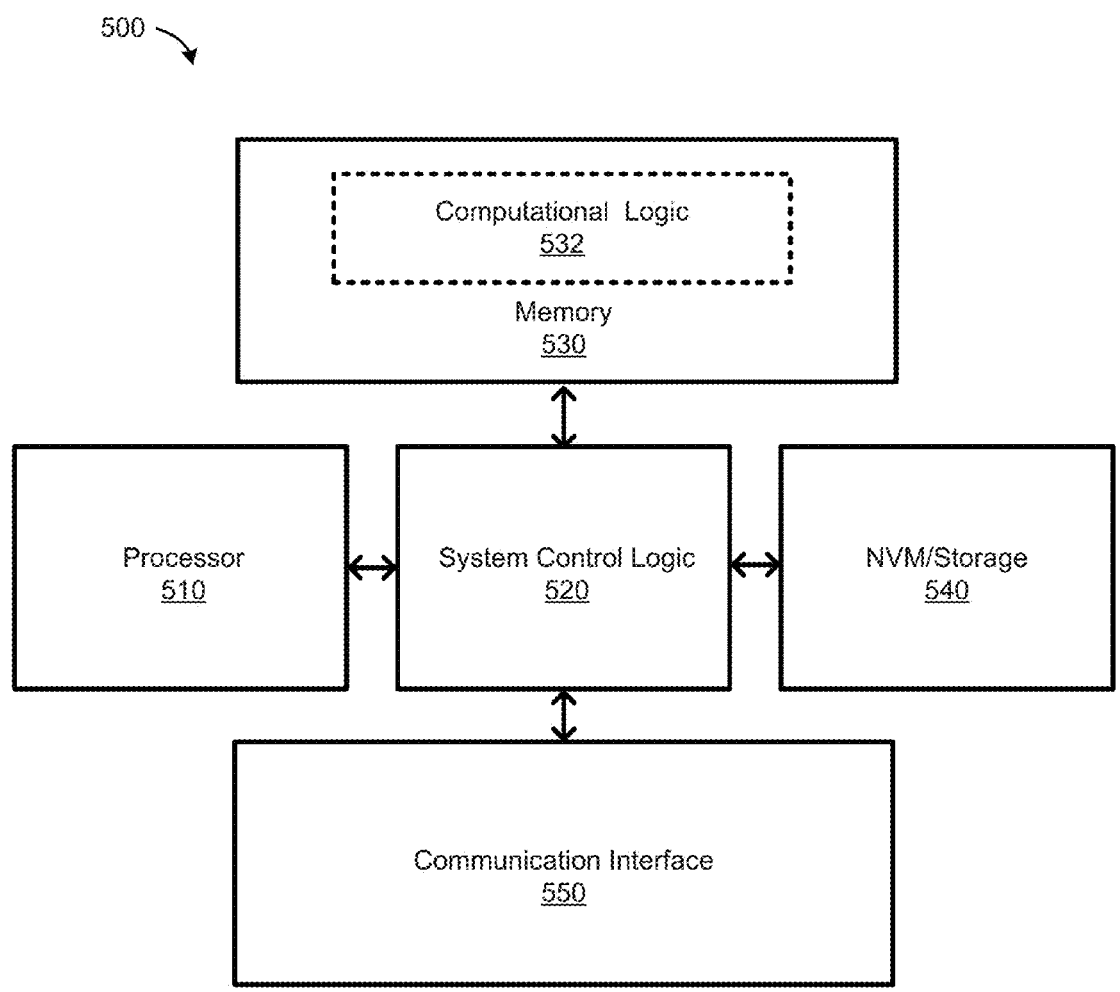
FIG. 5 illustrates an example computing device suitable for practicing the disclosed embodiments, in accordance with various embodiments.

FIG. 5 illustrates an embodiment of a computing device 500 suitable for practicing embodiments of the present disclosure. Computing device 500 may have a suitable form factor with shape, dimension, and materials configured to be installed on or with a pet door/gate. As illustrated, computing device 500 may include system control logic 520 coupled to processor 510, to system memory 530, to non-volatile memory (NVM)/storage 540, and to communication interface 550. In various embodiments, processor 510 may include one or more processor cores.

In embodiments, communication interface 550 may provide an interface for computing device 500 to communicate with the variety of user devices or the variety of systems/services in the cloud as previously discussed in connection with FIG. 1. In embodiments, communication interface 550 may provide an interface for computing device 500 to communicate over one or more networks and/or with any other suitable device. Communication interface 550 may include any suitable hardware and/or firmware, such as a network adapter, one or more antennas, wireless interface(s), and so forth. In various embodiments, communication interface 550 may include an interface for computing device 500 to use radio-frequency identification (RFID), near field communication (NFC), optical communications, or other similar technologies to communicate directly (e.g., without an intermediary) with another device. In various embodiments, communication interface 550 may interoperate with radio communications technologies such as, for example, Wideband Code Division Multiple Access (WCDMA), Global System for Mobile Communications (GSM), Long Term Evolution (LTE), Bluetooth®, Zigbee, and the like.

In some embodiments, system control logic 520 may include any suitable interface controllers to provide for any suitable interface to the processor 510 and/or to any suitable device or component in communication with system control logic 520. System control logic 520 may also interoperate with a display (not shown), e.g., to display information to pets. In various embodiments, the display may include one of various display formats and forms, such as, for example, liquid-crystal displays, cathode-ray tube displays, e-ink displays, projection displays. In various embodiments, the display may include a touch screen.

In some embodiments, system control logic 520 may include one or more memory controllers (not shown) to provide an interface to system memory 530. System memory 530 may be used to load and store data and/or instructions, for example, for computing device 500. System memory 530 may include any suitable volatile memory, such as dynamic random access memory (DRAM), for example.

In some embodiments, system control logic 520 may include one or more input/output (I/O) controller(s) (not shown) to provide an interface to NVM/storage 540, communication interface 550, and various input/output devices, such as speakers, microphones, displayers, projectors, etc. (peripheral devices not shown). NVM/storage 540 may be used to store data and/or instructions, for example. NVM/storage 540 may include any suitable non-volatile memory, such as flash memory, for example, and/or may include any suitable non-volatile storage device(s), such as one or more hard disk drives (HDD), one or more solid-state drives, one or more compact disc (CD) drives, and/or one or more digital versatile disc (DVD) drives, for example. NVM/storage 540 may include a storage resource that is physically part of a device on which computing device 500 is installed or it may be accessible by, but not necessarily a part of, computing device 500. For example, NVM/storage 540 may be accessed by computing device 500 over a network via communication interface 550.

In embodiments, system memory 530, NVM/storage 540, and system control logic 520 may include, in particular, temporal and persistent copies of computational logic 532. Computational logic 532 may include instructions that, when executed by processor 510, result in computing device 500 providing pet access control, such as, but not limited to, processes 300 of FIGS. 3 and 400 of FIG. 4. In embodiments, computational logic 532 may include instructions that, when executed by processor 510, result in computing device 500 performing various functions associated with identification module 250, input module 220, output module 230, authentication module 260, action module 270, or networking module 280, in connection with FIG. 2.

In some embodiments, processor 510 may be packaged together with system control logic 520 and/or computational logic 532. In some embodiments, at least one of the processor(s) 510 may be packaged together with system control logic 520 and/or computational logic 532 to form a System in Package (SiP). In some embodiments, processor 510 may be integrated on the same die with system control logic 520 and/or computational logic 532. In some embodiments, processor 510 may be integrated on the same die with system control logic 520 and/or computational logic 532 to form a System on Chip (SoC).

Depending on which modules of apparatus 200 in connection with FIG. 2 are hosted by computing device 500, the capabilities and/or performance characteristics of processor 510, system memory 530, and so forth, may vary. In various implementations, computing device 500 may be an embedded system, a stand-alone computing device, or a part of an integrated complex device, enhanced with the teachings of the present disclosure.

Figure 6:
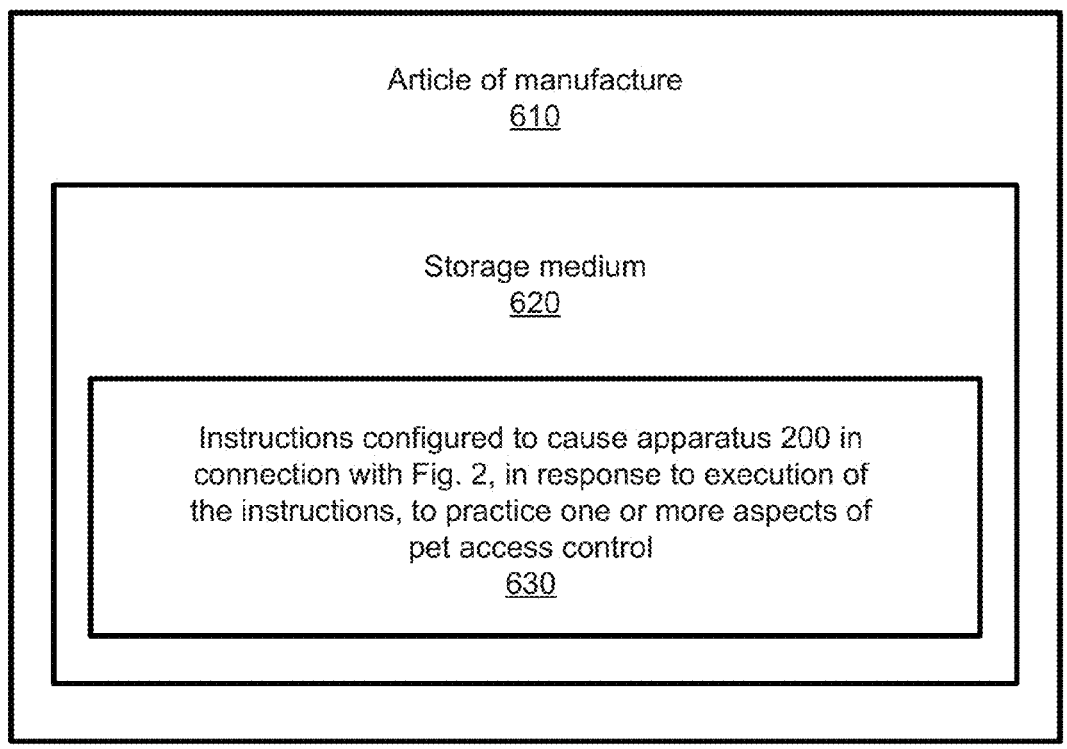
FIG. 6 illustrates an article of manufacture having programming instructions, incorporating aspects of the present disclosure, in accordance with various embodiments.

FIG. 6 illustrates an article of manufacture 610 having programming instructions, incorporating aspects of the present disclosure, in accordance with various embodiments. In various embodiments, an article of manufacture may be employed to implement various embodiments of the present disclosure. As shown, the article of manufacture 610 may include a computer-readable non-transitory storage medium 620 where instructions 630 are configured to practice embodiments of or aspects of embodiments of any one of the processes described herein. The storage medium 620 may represent a broad range of persistent storage media known in the art, including but not limited to flash memory, dynamic random access memory, static random access memory, an optical disk, a magnetic disk, etc. Instructions 630 may enable an apparatus, in response to its execution by the apparatus, to perform various operations described herein. As an example, storage medium 620 may include instructions 630 configured to cause an apparatus, e.g., apparatus 200 in connection with FIG. 2, to practice some aspects of pet access control, e.g., as illustrated in process 300 of FIG. 3 or in process 400 of FIG. 4, in accordance with embodiments of the present disclosure. In embodiments, computer-readable storage medium 620 may include one or more computer-readable non-transitory storage media. In other embodiments, computer-readable storage medium 620 may be transitory, such as signals, encoded with instructions 630.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The following paragraphs describe examples of various embodiments.

Example 1 is an apparatus for animal access control, which may include an identification module to receive a digital identification from an animal; an authentication module, coupled to the identification module, to determine an access authorization for the animal based on the digital identification and at least one access rule; and an action module, coupled to the authentication module, to control operating of an entry based on the access authorization.

Example 2 may include the subject matter of Example 1, and may further include an audio input or image capture device, coupled to the authentication module, to capture audio or image information of the animal or surrounding of the entry. The authentication module may determine the access authorization further based on the audio or image information captured.

Example 3 may include the subject matter of Example 2, and may further specify that the authentication module is to deny the access authorization upon detecting another animal in a vicinity of the animal based at least in part on one or more images captured by the image capture device.

Example 4 may include any subject matter of Examples 2-3, and may further include an audio output or display device to provide an audible instruction or a visual instruction to the animal, wherein the authentication module is to determine the access authorization for the animal based at least in part on a response of the animal captured by the audio input or image capture device.

Example 5 may include any subject matter of Examples 1-4, and may further specify that the action module is further configured to dispense an animal treat to the animal when the authentication module verifies one or more predetermined behavioral patterns of the animal.

Example 6 may include any subject matter of Examples 1-5, and may further specify that the identification module comprises a radio-frequency identification reader.

Example 7 may include any subject matter of Examples 1-6, and may further specify that a networking module, coupled with the authentication module, to wirelessly communicate with a user device to facilitate the user device to program the authentication module.

Example 8 may include any subject matter of Examples 2-7, and may further include a networking module, coupled with the identification module and the authentication module, to provide the received digital identification or the captured image information of the animal to a user device, and to receive, in response, from the user device, an access command for the authentication module.

Example 9 may include any subject matter of Examples 1-8, and may further include a networking module, coupled to the authentication module, to receive climate information near the apparatus from an online service, and wherein the authentication module is to further determine the access authorization for the animal based at least in part on the climate information near the apparatus.

Example 10 may include any subject matter of Examples 1-8, and may further specify that the entry is an animal door.

Example 11 may include any subject matter of Examples 1-9, and may further specify that the apparatus further includes an animal door.

Example 12 is a method for animal access control, which may include receiving, by a computing device, a digital identification of an animal; verifying, by the computing device, an audio or video indicator of the animal; and determining, by the computing device, an access authorization for the animal based on the digital identification, the audio or video indicator, and at least one access rule.

Example 13 may include the subject matter of Example 12, and may further include capturing, by the computing device, the audio or video indicator of the animal; and determining, by the computing device, the access authorization for the animal based on a comparison between the audio or video indicator of the animal and a known audio or video sample of the animal.

Example 14 may include the subject matter of Example 12 or 13, and may further include providing, by the computing device, an audible or visual instruction to the animal in response to receiving the digital identification of the animal.

Example 15 may include the subject matter of Example 14, and may further include causing, by the computing device, an animal treat to be dispensed to the animal based on a response of the animal to the audible or visual instruction.

Example 16 may include any subject matter of Examples 12-15, and may further include detecting, by the computing device, another animal in a vicinity of the animal, wherein determining is further based on whether the another animal is detected in the vicinity.

Example 17 may include any subject matter of Examples 12-16, and may further include receiving, by the computing device, in-situ environmental information near the animal; and determining, by the computing device, the access authorization further based on the in-situ environmental information.

Example 18 may include any subject matter of Examples 12-17, and may further specify that the determining is further based on a time of day the digital identification is received.

Example 19 may include any subject matter of Examples 12-18, and may further include logging, by the computing device, a result of the determining into an access log.

Example 20 is at least one storage medium, which may include a plurality of instructions configured to cause an apparatus, in response to execution of the instructions by the apparatus, to practice any subject matter of Examples 12-19.

Example 21 is an apparatus for animal access control, which may include means to practice any subject matter of Examples 12-19.

Example 22 is an apparatus for animal access control, which may include means for receiving a digital identification of an animal; means for verifying an audio or video indicator of the animal; and means for determining an access authorization for the animal based on the digital identification, the audio or video indicator, and at least one access rule.

Example 23 may include the subject matter of Example 22, and may further include means for means for capturing the audio or video indicator of the animal; and wherein said means for determining comprises means for comparing the audio or video indicator of the animal and a known audio or video sample of the animal.

Example 24 may include the subject matter of Example 22 or 23, and may further include means for providing an audible or visual instruction to the animal in response to receiving the digital identification of the animal.

Example 25 may include any subject matter of Examples 22-24, and may further include means for causing an animal treat to be dispensed to the animal based at least in part on a response of the animal to the audible or visual instruction.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus to provide authorized access for an animal, comprising:
   an identification module to receive a predetermined digital identification from the animal; an authentication module, coupled to the identification module, to determine an access authorization for the animal based on the digital identification and at least one access rule; and
   an action module, coupled to the authentication module, to control operating of an entry based on the access authorization;
   an output module, coupled to the authentication module, to provide an audible instruction or a visual instruction to the animal in response to confirmed reception of the predetermined digital identification;
   an input module, coupled to the authentication module, to capture an audio or image information of the animal or surrounding of the entry and an audio or visual indicator of the animal in response to providing the audible instruction or the visual instruction; and wherein the authentication module is further to determine the access authorization for the animal based at least in part on the captured audio or image information of the animal or surrounding of the entry, and a comparison between the captured audio or visual indicator of the animal and a known audio or video sample of the animal.

2. The apparatus according to claim 1, wherein the authentication module is to deny the access authorization upon detecting another animal in a vicinity of the animal based at least in part on one or more images captured by an image capture device.

3. The apparatus according to claim 1, further comprising:
a networking module, coupled with the identification module and the authentication module, to provide the received digital identification or the captured image information of the animal to a user device, and to receive, in response, from the user device, an access command for the authentication module.

4. The apparatus according to claim 1, wherein the action module is further to dispense an animal treat to the animal when the authentication module verifies one or more predetermined behavioral patterns of the animal.

5. The apparatus according to claim 1, wherein the identification module comprises a radio-frequency identification reader.

6. The apparatus according to claim 1, further comprising:
a networking module, coupled with the authentication module, to wirelessly communicate with a user device to facilitate the user device to program the authentication module.

7. The apparatus according to claim 1, further comprising:
a networking module, coupled to the authentication module, to receive climate information near the apparatus from an online service, and wherein the authentication module is to further determine the access authorization for the animal based at least in part on the climate information near the apparatus.

8. The apparatus according to claim 1, wherein the entry is an animal door comprising multiple gates and wherein the authentication module is further to selectively unlock at least one of the multiple gates based on the digital identification from the animal.

9. The apparatus according claim 8, wherein the apparatus further comprises the entry.

10. At least one non-transitory machine readable storage medium having a plurality of instructions to enable an apparatus, in response to execution of the plurality of instructions by the apparatus, to:
receive a predetermined digital identification of an animal;
provide an audible or visual instruction to the animal in response to receiving the predetermined digital identification of the animal;
receive an audio or visual indicator of the animal in response to providing the audible instruction or the visual instruction;
determine an access authorization for the animal based on the digital identification, at least one access rule, and a verification comparison between the received audio or visual indicator of the animal and a known audio or video sample of the animal; and
provide access to an entry for the animal by the apparatus in response to the determined access authorization.

11. The storage medium of claim 10, the instructions to further cause the apparatus to:
cause an animal treat to be dispensed to the animal based on the audio or visual indicator of the animal in response to the audible instruction or the visual instruction.

12. The storage medium of claim 10, the instructions to further cause the apparatus to:
detect another animal in a vicinity of the animal;
wherein determine an access authorization is further based on whether the another animal is detected in the vicinity.

13. The storage medium of claim 10, the instructions to further cause the apparatus to:
receive in-situ environmental information near the animal; and
determine the access authorization further based on the in-situ environmental information.

14. The storage medium of claim 10, the instructions to further cause the apparatus to:
log a result of the determining into an access log.

15. A method, comprising:
receiving a predetermined digital identification of an animal;
providing, by an output module, an audible or visual instruction to the animal in response to receiving the predetermined digital identification of the animal;
receiving, by an input module, an audio or visual indicator of the animal in response to providing the audible instruction or the visual instruction;
verifying the received audio or visual indicator of the animal by a comparison with a known audio or video sample of the animal;
determining, by an authorization module, an access authorization for the animal based on the digital identification, at least one access rule, and verification of the received audio or visual indicator of the animal; and
granting access, by an action module, of the animal to an entry in response to the determined access authorization.

16. The method of claim 15, further comprising:
causing an animal treat to be dispensed to the animal based at least in part on a response of the animal to the audible or visual instruction.

17. The apparatus of claim 1, wherein the output module is further to provide and randomly select the audible instruction or the visual instruction to the animal from a set of predetermined commands.

18. The non-transitory machine readable storage medium having the plurality of instructions of claim 10, further to randomly select the audible instruction or the visual instruction to the animal from a set of predetermined commands.

19. The method of claim 15, further comprising to randomly select the audible instruction or the visual instruction to the animal from a set of predetermined commands.

* * * * *